United States Patent
Nahm et al.

(10) Patent No.: US 8,024,723 B2
(45) Date of Patent: Sep. 20, 2011

(54) SYSTEM AND METHOD FOR PEER-TO-PEER DATACASTING IN A BROADCASTING NETWORK

(75) Inventors: Kitae Nahm, Irvine, CA (US); Esther Xing Zheng, Irvine, CA (US); Praveen Kashyap, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1159 days.

(21) Appl. No.: 11/750,940

(22) Filed: May 18, 2007

(65) Prior Publication Data

US 2008/0287058 A1    Nov. 20, 2008

(51) Int. Cl.
*G06F 9/44* (2006.01)
*G06F 9/45* (2006.01)

(52) U.S. Cl. .................. 717/172; 717/176; 709/203
(58) Field of Classification Search .......... 717/171–176; 709/203–205
See application file for complete search history.

(56) References Cited

U.S. PATENT DOCUMENTS

| | | | | |
|---|---|---|---|---|
| 5,430,877 | A * | 7/1995 | Naylor ........................... | 717/171 |
| 6,233,604 | B1 * | 5/2001 | Van Horne et al. ........... | 709/203 |
| 6,321,253 | B1 * | 11/2001 | McKeen et al. ............... | 709/204 |
| 6,381,741 | B1 * | 4/2002 | Shaw ............................. | 717/168 |
| 6,490,722 | B1 * | 12/2002 | Barton et al. ................. | 717/174 |
| 6,757,710 | B2 * | 6/2004 | Reed ............................. | 709/203 |
| 7,370,114 | B1 * | 5/2008 | Philyaw et al. ............... | 709/231 |
| 7,500,235 | B2 * | 3/2009 | Maynard et al. ............. | 717/172 |
| 7,548,988 | B2 * | 6/2009 | Philyaw et al. ............... | 709/231 |
| 7,613,770 | B2 * | 11/2009 | Li .................................. | 709/203 |
| 7,614,052 | B2 * | 11/2009 | Wei ............................... | 717/176 |
| 7,673,297 | B1 * | 3/2010 | Arsenault et al. ............ | 717/168 |
| 7,676,804 | B2 * | 3/2010 | Ferguson et al. ............. | 717/173 |
| 7,681,192 | B2 * | 3/2010 | Dietsch et al. ............... | 717/172 |
| 7,716,662 | B2 * | 5/2010 | Seiden .......................... | 717/173 |
| 7,743,147 | B2 * | 6/2010 | Suorsa et al. ................. | 709/226 |

(Continued)

FOREIGN PATENT DOCUMENTS

KR    10-2008-0077054    8/2008

OTHER PUBLICATIONS

Palix et al, "Tracking code patterns over multiple software versions with herodotos", ACM AOSD, pp. 169-180, 2010.*

(Continued)

*Primary Examiner* — Anil Khatri
(74) *Attorney, Agent, or Firm* — Beyer Law Group LLP

(57) ABSTRACT

A system and method for peer-to-peer datacasting in a broadcasting network is disclosed. The method may include providing first and second peers and a source, wherein the first and second peers are configured to communicate data with the source via the broadcasting network, wherein each of the first and second peers stores an updatable software object, wherein the source stores the most recent version of the software object, and wherein the second peer is configured to communicate data with the source via the first peer. The method may also include receiving, at the first peer, an update request for a software object from the second peer and obtaining, at the first peer, the most recent version of the software object associated with the update request. The method may further include transmitting, at the first peer, the requested most recent version of the software object to the second peer and updating the software object of the second peer with the received software object.

30 Claims, 9 Drawing Sheets

U.S. PATENT DOCUMENTS 7,814,480 B2 * 10/2010 Sakuda et al. .............. 717/173
2006/1000794       1/2006 Li et al.
2006/0080454 A1   4/2006 Li

OTHER PUBLICATIONS

Moissinac et al, "A model fro the delivery of interactive applications over broadcast channels", ACM MoVID, pp. 15-19, 2010.*

Kuacharoen et al, "Software streaming via block streaming", IEEE Date, pp. 1-6, 2003.*

Hefeeda et al, "On burst transmission scheduling in mobile TV broadcast networks", IEEE/ACM Trans. on networking, vol. 18, No. 2, pp. 610-623, 2010.*

R. Crinon, D. Bhat, D. Catapano, G. Thomas, J. Van Loo, G. Bang, "Data broadcasting and interactive television", Proceedings of IEEE, vol. 94, No. 1, Jan. 2006.

ATSC data broadcast standard, ATSC Standard A/90, 2000.

Software download data service, ATSC Standard A/97, 2004.

Specifications for system software update in DVB systems, ETSI Standard ETSI TS 102 006 V1.3.1, 2004.

S. McCanne, V. Jacobson, M. Vetterli, "Receiver-driven layered multicast", Proceedings of ACM SIGCOMM, Standford, CA, Aug. 1996.

J. Byers, M. Luby, M. Mitzenmacher, "A digital fountain approach to asynchronous eliable multicast", IEEE journal of selected areas in communications, vol. 20, No. 8, Oct. 2002.

S. Lee, R. Sherwood, B. Bahattacharjee, "Cooperative peer groups in NICE", Proceedings of IEEE INFOCOM, Orlando, FL, Mar. 2003.

D. Tran, K. Hua, and T. Do, "ZIGZAG: an efficient peer-to-peer scheme for media streaming", Proceedings of IEEE INFOCOM, Orlando, FL, Mar. 2003.

R. Rejaie, A. Ortega, "PALS: peer-to-peer adaptive layered streaming", Proceedings of ACM NOSSDAV, Monterey, CA, Jun. 2003.

M. Hefeeda, A. Habib, B. Botev, D. Xu, and B. Bhargava, "PROMISE: peer-to-peer media streaming using CollectCast", Proceedings of ACM Multimedia, Nov. 2003, Berkeley, CA.

V. N. Padmanabhan and K. Sripanidkulchai, "The case for cooperative networking", Proceedings of IPTPS, Cambridge, MA, Mar. 2002.

* cited by examiner

SYSTEM AND METHOD FOR PEER-TO-PEER DATACASTING IN A BROADCASTING NETWORK

BACKGROUND OF THE INVENTION

1. Field of the Invention

The present invention relates to data broadcasting (datacasting), and in particular, to peer-to-peer datacasting in a broadcasting network, for example, a television (TV) broadcasting network.

2. Description of the Related Technology

In addition to audio and video (A/V) services, advanced digital TV services offer a data service in which software objects are distributed via a digital broadcasting channel. The software objects include, but are not limited to, electronic program guide (EPG), software component (e.g., Java applets, library, and web components), software application (e.g., game), and firmware image, etc. For this purpose, advanced television systems committee (ATSC) and digital video broadcasting (DVB) specify data broadcasting services (also known as datacasting). Digital broadcasting provides a one-way channel from a broadcaster to a number of client devices, but lacks a return channel from the client devices to the broadcaster. Without the return channel, the broadcasters do not know how many client devices need the software object and whether the client devices receive it when the software object is broadcasted. To compensate the lack of the return channel, the datacasting service of this type uses a carousel server which repeatedly broadcasts the software objects in a continuous cycle over a digital broadcasting channel. The client devices may choose to ignore the software object or to wait for another software object until it is broadcasted by the carousel server.

SUMMARY OF CERTAIN INVENTIVE ASPECTS

One aspect of the invention provides a method of peer-to-peer datacasting in a broadcasting network, the method comprising: i) providing first and second peers and a source, wherein the first and second peers are configured to communicate data with the source via the broadcasting network, wherein each of the first and second peers stores an updatable software object, and wherein the source stores the most recent version of the software object, ii) receiving, at the first peer, an update request for the software object from the second peer, iii) obtaining, at the first peer, the most recent version of the software object associated with the update request, iv) transmitting, at the first peer, the requested most recent version of the software object to the second peer and v) updating the software object of the second peer with the received software object.

Another aspect of the invention provides a method of peer-to-peer datacasting in a digital communication network, the method comprising: i) providing a first peer, ii) receiving, at the first peer, an update request for a software object, from a second peer, iii) transmitting the update request to a third peer, wherein each of the first, second and third peers stores an updatable software object, iv) receiving, at the first peer, the requested most recent version of the software object from the third peer, v) updating the software object of the first peer with the received most recent version and vi) transmitting the requested most recent version of the software object to the second peer so as to update the software object of the second peer with the received most recent version.

Another aspect of the invention provides a system for peer-to-peer datacasting in a broadcasting network, the system comprising: a controller being in data communication with a plurality of peers and a source, wherein each of the plurality of peers is configured to store an updatable software object, wherein one of the plurality of peers is configured to receive and store the most recent version of the software object from the source, and wherein the controller is configured to control the plurality of peers such that the software objects of each of the plurality of peers are updated with the most recent version by way of sequential delegation of 1) an update request and 2) the most recent version of the software object between the plurality of peers.

Another aspect of the invention provides one or more processor-readable storage devices having processor-readable code embodied on the processor-readable storage devices, the processor-readable code for programming one or more processors to perform a method of peer-to-peer datacasting in a digital communication network, the method comprising: i) providing a first peer, ii) receiving, at the first peer, an update request for a software object, from a second peer, iii) transmitting the update request to a third peer, wherein each of the first, second and third peers stores an updatable software object, iv) receiving, at the first peer, the requested most recent version of the software object from the third peer, v) updating the software object of the first peer with the received most recent version and vi) transmitting the requested most recent version of the software object to the second peer so as to update the software object of the second peer with the received most recent version.

Still another aspect of the invention provides a system for peer-to-peer datacasting in a broadcasting network, the system comprising: i) means for providing a first peer, ii) means for receiving, at the first peer, an update request for a software object, from a second peer, iii) means for transmitting the update request to a third peer, wherein each of the first, second and third peers stores an updatable software object, iv) means for receiving, at the first peer, the requested most recent version of the software object from the third peer, v) means for updating the software object of the first peer with the received most recent version and vi) means for transmitting the requested most recent version of the software object to the second peer so as to update the software object of the second peer with the received most recent version.

DETAILED DESCRIPTION OF CERTAIN INVENTIVE EMBODIMENTS

Figure 1:
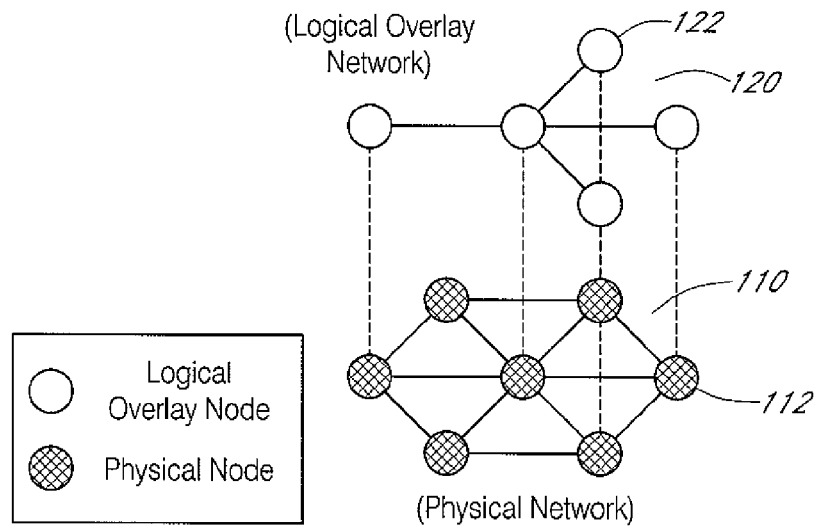
FIG. 1 illustrates a conceptual diagram showing an exemplary overlay network over physical topology which can be applied to embodiments of the invention.

The broadcast-based datacasting service using a carousel server is neither cost-effective nor scalable when it comes to a service for selecting many client devices. First, the carousel server repeatedly broadcasts software objects to all of the client devices in the broadcasting network. It is a waste of the broadcast resource that the broadcasted software objects are repeatedly discarded by unrelated client devices. Second, the finite length of the carousel cycle limits the number of the software objects that can be distributed in a service cycle. This limits the scalability and flexibility of the service with regard to the exploding diversity of the client devices. Third, the dependency on the local broadcast infrastructure further limits the service accessibility and increases the cost. For example, let us assume that a TV manufacturer wants to update firmware of a specific TV model which is located across multiple broadcasting areas. Because most TV manufacturers do not own a broadcasting infrastructure, the TV manufacturer needs an agreement with all of the related local TV stations and cable/satellite TV service providers for the firmware datacasting. The cost of doing this is prohibitive and impractical for those who do not own broadcast infrastructure.

Today, digital communication network offers various ways of network connection for client devices. For example, client devices can easily get connected with each other via a cable network, a phone network, or a wireless network. In this environment, the peer-to-peer (P2P) file share technology is a popular way for a number of client devices to share software objects. A number of client devices (called as peers) having the same interest establish a logical P2P network by themselves over a communication network. Then, a peer (a client device) chooses a software object to download, and searches for the other peers having the software object through various means. Then, the peer downloads the software object directly from one of the peers found from the search. The client devices in the P2P file share system become a server as well as a client in the view of the traditional server-client model.

The connected-everywhere environment is also the case with the broadcast client devices. But, it is not technically straightforward to apply the existing P2P technology to the datacasting service. First, the digital broadcasting is a "sender-push" model where a sender broadcasts software objects to a number of receivers. But, the P2P file share service is a "receiver-pull" model where a receiver decides what to receive and which sender(s) to receive from. So, it is not straightforward to realize a one-to-many data broadcasting service using a one-to-one or many-to-one P2P file share technology. Second, the client devices of digital broadcasting are typically a resource-constrained machine which is specifically designed to show audio/video (A/V) contents. The routine network management of many P2P systems becomes a non-A/V processing overhead which is undesirable to the resource-constrained systems like TVs and set-top-boxes.

In fact, the client devices of digital broadcasting are quite well-behaving and reliable in terms of device lifetime and network connectivity. For example, TVs and set-top-boxes remain powered on and connected to a network even though they do not show A/V contents on display. Furthermore, a software object of the datacasting service has common characteristics. The size is relatively large, the software object is commonly applied to a group of client devices, and the software object has relatively long lifetime yet requires a routine update/refresh. For example, the cable set-top-boxes in a local area share the electronic program guide (EPG), updated daily, with the TV schedule of several days. Even if the update is delayed by several hours, the viewers may hardly recognize the differences. Another example is a firmware update for a TV. Unless the older version has a serious flaw, the clients can keep using the older software for a while and tolerate the absence of the most recent update which occurs infrequently.

Leveraging these factors, at least one embodiment of this invention realizes a novel datacasting service based on the P2P technology. Another embodiment of the invention provides a massive software distribution service by "chain of delegation" rule which allows a software object to propagate through related peers back to back. As a result, in at least one embodiment, the proposed peer-to-peer datacasting service is available to those who do not own the broadcasting infrastructure, for example, a TV manufacturer who wants to update a firmware image for a TV model. One embodiment of the invention provides a peer-to-peer datacasting in which a software object is shared by the broadcast client devices instead of being broadcasted from a carousel server.

FIG. 1 illustrates a conceptual diagram showing an exemplary logical overlay network 120 over a physical network 110 which can be applied to embodiments of the invention. The physical network 110 may include a plurality of physical nodes (peers) 112 and the logical network 120 may include a plurality of logical nodes (peers) 122 as shown in FIG. 1. In one embodiment, regardless of the underlying physical topology (or network) 110, a number of peers 122 may establish a logical overlay network based on, for example, a certain motivation such as the common interest (to be described later). Hereinafter, the description will be mainly provided based on the logical network for convenience.

Figure 2:
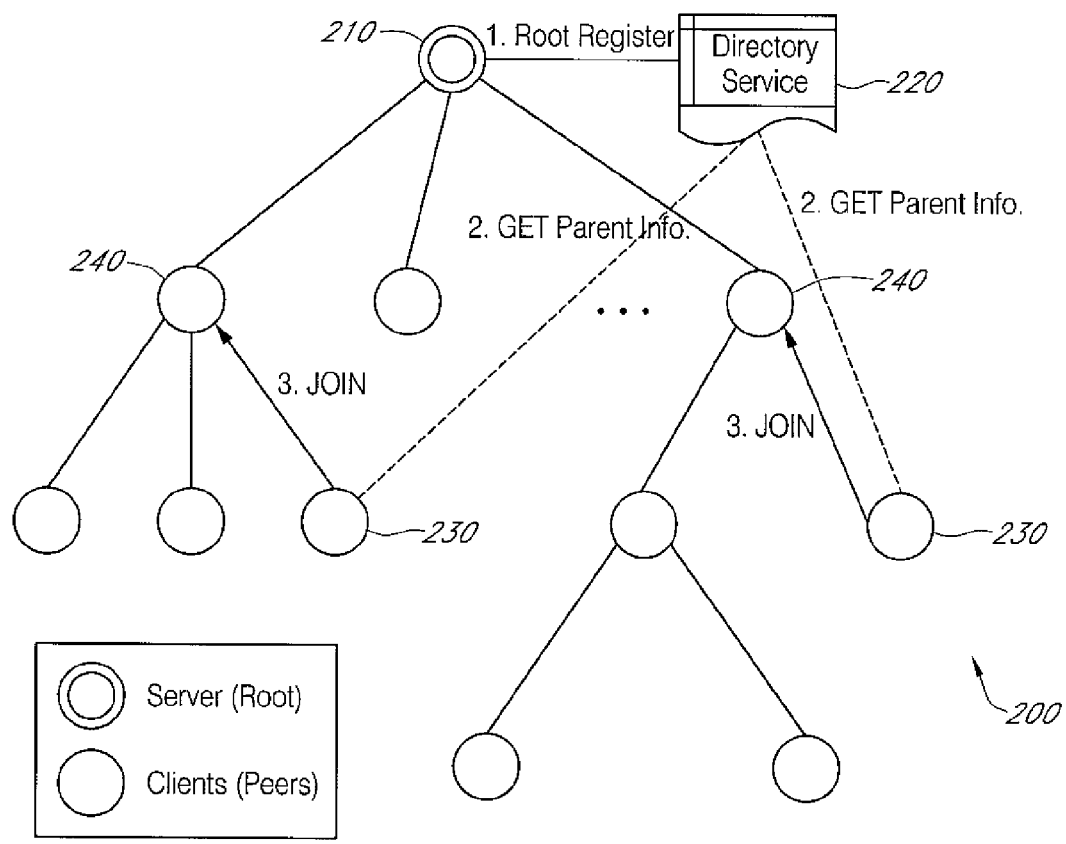
FIG. 2 illustrates a conceptual diagram showing a peer-to-peer datacasting system having a tree-structure according to one embodiment of the invention.

FIG. 2 illustrates a conceptual diagram showing a peer-to-peer datacasting system 200 having a tree-structure according to one embodiment of the invention. In one embodiment, the network nodes may include a broadcast client device which receives content from a broadcasting service provider (e.g., regular TV or cable set-top-box). In another embodiment, the node may include an interactive device which communicates with a content provider or other TVs across the networks (e.g., Internet protocol (IP) TV). In one embodiment, the client devices may or may not directly receive a software object from a server. In an embodiment where a server does not provide the software objects directly to all the client devices, the system may include a plurality of client devices (peers) at least one of which is configured to download the most recent software object from the server. In this embodiment, the plurality of peers can update their software objects with the most recent one by way of a series of delegation of 1) an update request and/or 2) the most recent software object (to be described later in greater detail). In another embodiment, the system 200 may be configured with any other network, either currently available or developed in the future.

In one embodiment, the system 200 may include a data/file repository 210, a directory service unit 220 and a plurality of peers 230 and 240. In one embodiment, as shown in FIG. 2, the system elements 210-240 may form a tree-structure. In another embodiment, the system 200 may include other topologies (examples thereof will be described later). The system elements 210-240 and data are further described below.

Data/File Repository (210)

In one embodiment, the data/file repository (root or source) 210 may include the most up-to-date software object to be distributed to the peers 230 and 240 in a given group of peers (e.g., a group having the common interest; hereinafter will be frequently referred to as an "interest group"). In one embodiment, the data/file repository 210 may be a server which can send data or file directly to the broadcast client devices. In another embodiment, the server 210 may include any other server which can download data or file to clients or peers. In another embodiment, the data/file repository 210 may be peers which store the most up-to-date software object. In one embodiment, a single peer of the interest group may be designated to be the data/file repository 210 for the group. In another embodiment, a plurality of peers of the interest group may function as the data/file repository 210 for a selected group.

Directory Service Unit (220)

In one embodiment, the directory service unit 220 may monitor and maintain the network system 200. In one embodiment, the server 210 may register itself to the directory service unit 220. In one embodiment, new peers may contact the directory service unit 220 to acquire necessary authorization and subscription information before joining an interest group. The directory service unit 220 may be independent of the peers 230 and 240, in that the directory service unit 220 is not the consumer of the software object itself. In this embodiment, the directory service unit 220 may be located outside of the overlay network. In one embodiment, the directory service unit 220 may include a typical database (DB) and a controller or processor to control the DB. In another embodiment, the directory service unit 220 and server 210 may be incorporated into one entity (e.g., a server).

Figure 8:
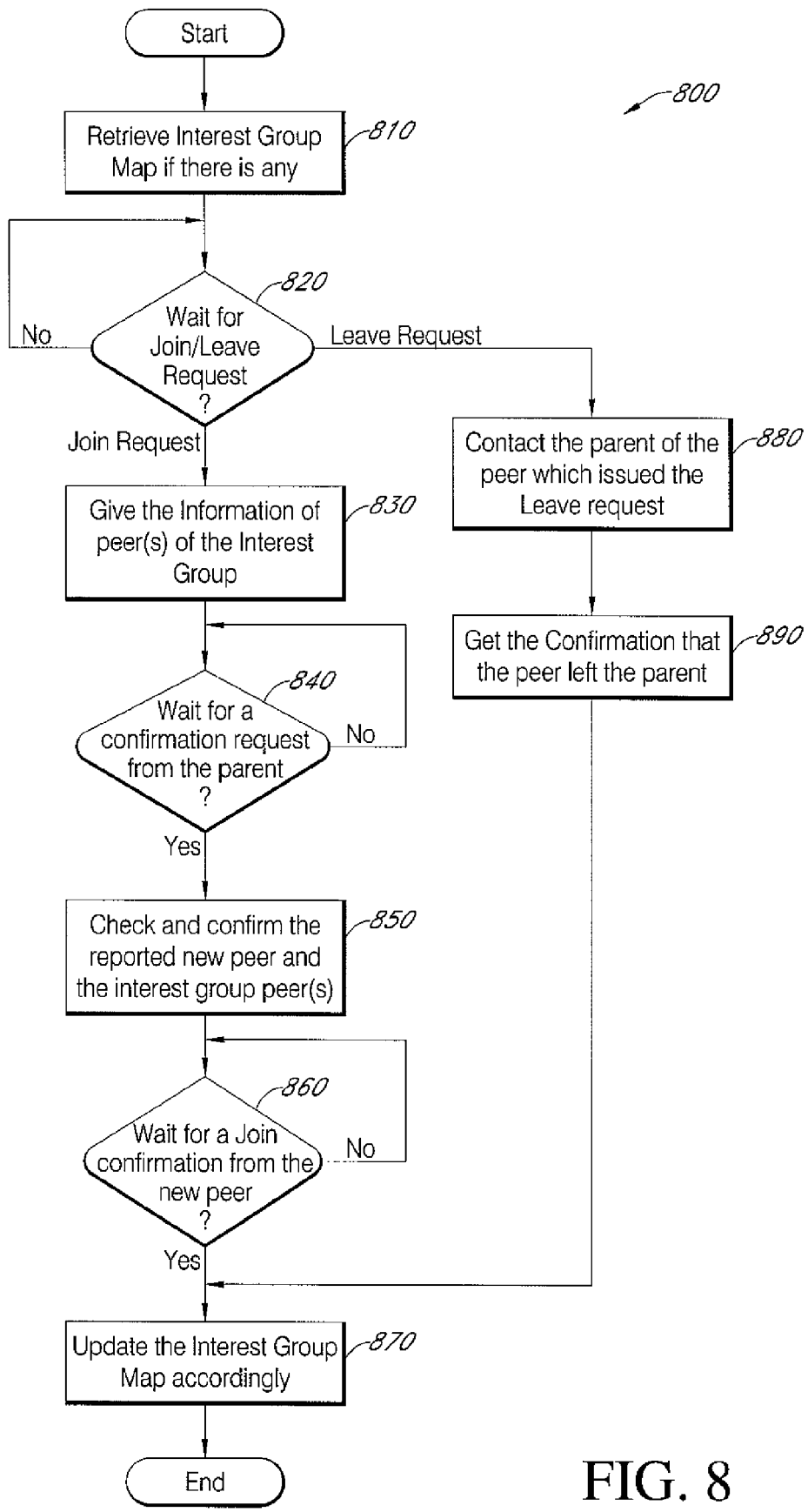
FIG. 8 is a flowchart for an exemplary procedure of the directory service unit according to one embodiment of the invention.

Referring to FIGS. 2 and 8, an exemplary operation of the directory service unit 220 will be described in more detail. FIG. 8 is a flowchart for an exemplary procedure 800 of the directory service unit 220 according to one embodiment of the invention. It will be appreciated that the procedure 800 is merely an example and other procedures are also possible. Furthermore, depending on the embodiments, additional states may be added, others removed, or the order of the states changes in FIG. 8.

The directory service unit 220 retrieves an interest group map which may have been previously created (810). In one embodiment, the interest group map includes information, for all peers and data repository 210 of the given interest group, which may be used to maintain and monitor the system 200. The directory service unit 220 waits for a join/leave request from a peer 230 (820). For example, in FIG. 2, the peer 230 sends a join request to the directory service unit 220 before joining the parent peer 240.

After receiving the join request from the peer 230, the directory service unit 220 provides information, for example, a list of candidate peers of an appropriate interest group to the peer 230 (830). Thereafter, the peer 230 may contact the parent peer 240 to join a specific interest group. The parent peer 240 may send a confirmation request to the directory service unit 220. In this embodiment, the directory service unit 220 waits for the confirmation request from the parent peer 240 (840). In one embodiment, the confirmation request is to ensure whether it is okay to accept the peer 230 as a new member peer of the interest group, for example, by performing a security check for the new peer 230.

After receiving the confirmation request from the parent peer 240, the directory service unit 220 checks and confirms that the reported new peer 230 is allowed to join the interested group peer(s) (850). In one embodiment, the directory service unit 220 may inform the new peer 230 of the confirmation. The directory service unit 220 waits for a join confirmation from the new peer 230 (860). After receiving the join confirmation from the new peer 230, the directory service unit 220 updates the interest group map accordingly (870).

Returning to state 820, if the directory service unit 220 receives a leave request from the peer 230, the unit 220 contacts the parent peer of the peer 230 which sent the leave request (880). In one embodiment, any member peer can send a leave request when it wants to leave its own interest group. Once the directory service unit 220 receives the confirmation, that the peer 230 left the parent peer of the interest group, from the parent peer (890), the directory service unit 220 updates the interest group map accordingly (870).

Peers

In one embodiment, the peers 230 and 240 may store or process software object in the system 200. In one embodiment, the peers 230 and 240 can be broadcast client devices such as a television or a set-top-box simply receiving data, or intermediate devices which can pass data to other devices (peers). In one embodiment, the device (peer) can perform this function automatically, regularly or irregularly according to its programmed instructions as a background task even when the device is set to a "sleep" mode. In this embodiment, the peers 230 and 240 may be connected to each other for data communication. In one embodiment, an interest group may be created by a group of peers which want to update the same EPG data or substantially the same kind of EPG data, a group of specific models (e.g., Samsung PDP TVs or LCD TVs, or TVs having the same model number) or by a group of peers using substantially the same kind of firmware or software components. In another embodiment, the interest group can be classified according to different criteria. In one embodiment, all of the peers in the same overlay network establish an interest group. In another embodiment, some of the peers in the same overlay network may belong to a different interest group.

In one embodiment, peers can be any devices involved in datacasting. They may be digital televisions, set-top boxes, interactive TVs (e.g., Internet TVs or IP TVs) or other computing devices which can handle datacasting. In one embodiment, the system 200 may work according to operation rules below. It will be appreciated that the following operation rules are merely an example and other operation rules may be also possible.

Exemplary Operation Rules

Receiver-Driven Delivery

In one embodiment, the data may be transferred primarily in a receiver-driven manner. For example, the receiver (i.e. the client device or the peer) determines whether or not and when to update the data. In this embodiment, the server (e.g., the repository or the peer which has the data) may send the requested data only after it receives a request from the receiver. In another embodiment, the dissemination of the control messages such as a critical event notification may be transmitted to all peers over the overlay network regardless of requests from receivers.

Chain of Delegation

The data and messages sent by a peer may be passed along to other peers back-to-back along the overlay topology. In one embodiment, all of the peers can update their data or file (older version) with the most recent software object by way of a series (chain) of delegation of 1) an update request and/or 2)

the most recent software object along the path where the peers are located. In the meantime, intermediary peers, which may be located between a source and a receiver and may not have the requested software object, may do more than just forwarding. The intermediary peers on the path may store the data and perform a task on behalf of other peers. In one embodiment where all of the peers in the system 200 belong to the same interest group, the intermediary peers may store the software object of common interest while also forwarding it to others. The peers may later provide a data/file service using the stored software object in response to a request from other peers (e.g., newly joined peer) on behalf of the original data/file repository 210 as long as the software object remains up-to-date.

Data/Message

In one embodiment, the data/message may be divided into three groups: commonly shared software object, one-to-one transaction, and control message. The common shared software object includes the software object shared by a number of nodes, such as file, data, library, firmware, image, web component, and any other software component. In embodiments, peers may send an update request to other peers or source to obtain the common software object. The one-to-one transaction includes a message exchange unique to the two communication participants. Authentication and membership messages sent between a peer and the directory service unit 220 are the examples. The control message may include the message for a more general purpose like network management. Clock information and event notification message are examples of this data type.

Request

In one embodiment, an intermediary peer may transfer or delegate a request message received from peer(s) to other peer(s) or source if the intermediary peer does not have the requested version of a software object. In another embodiment, where the intermediary peer needs to receive such a requested software object, the peer may replace the message with its own request. In this embodiment, the intermediary peer requests the software object of the common interest using the new message on behalf of the peer which originally issued the request message. Furthermore, the intermediary peer may complete the data/file service to the peer(s), which forwarded the original request after receiving the requested software object, by providing the updated software object to the request peer. In one embodiment, because of the data/file service delegation of the intermediary peers, the data/file repository 210 may not need to be up and running for the data/file service as long as the intermediary peers have the valid software object in them. Also, the multiple (common or same) requests from different peers to an intermediary peer may be consolidated into a single request from the intermediary peer, based on the "request delegation" rule.

Update/Download Activation (Operation)

In one embodiment, the availability of new data can be notified to the peers in various ways as exemplified below. It will be appreciated that other notification examples may also be possible.

Imprint

In one embodiment, the expiration time can be imprinted on the downloaded/updated software object either explicitly or implicitly. For instance, the daily update of EPG data in a cable network is explicit while a software update after detecting version mismatch is implicit.

Peers

In one embodiment, when a peer receives a request of the common software object from another peer and finds that the peer, which received the request, does not have the software object in it, the request message also serves as a notification of a new software object to the peer.

Broadcast

In one embodiment, the root can, for example, periodically or whenever an update occurs, broadcast the availability of a new software object over the entire tree. In this embodiment, the notification message can be considered to be commonly shared data as all of the peers of the system 200 may include such a notification message. So, the message is relayed over the tree in the same way as the distribution of other commonly shared data.

Maintenance

In one embodiment, the directory service unit 220 may have the most recent (up-to-date) information about the data, even though it may not store the data by itself. In one embodiment, the directory service unit 220 may obtain such information by, for example, periodically communicating with peers. For example, peers may be a set top box. Generally the set top box is configured to communicate data with other peers (other set top boxes) and/or the directory service unit 220. The directory service unit 220 may obtain the status of all of the peers and server based on such interactive communication.

In one embodiment, being closer to the root 210, the parent node (e.g., peer 240 in FIG. 2) may have more recent software objects than the children nodes (e.g., peer 230 in FIG. 2). So, whenever the peers have a chance to contact the directory service unit 220 for the purpose of a regular membership, tree maintenance or some other reasons, the peers can check if the local data is out of date. This embodiment may be useful to a new client who joins the service for the first time, or to the clients which were temporarily unavailable due to a sub-tree failure, for example, where a peer between a parent peer and a child peer is missing or not working properly.

Operation of Embodiments

Figure 9:
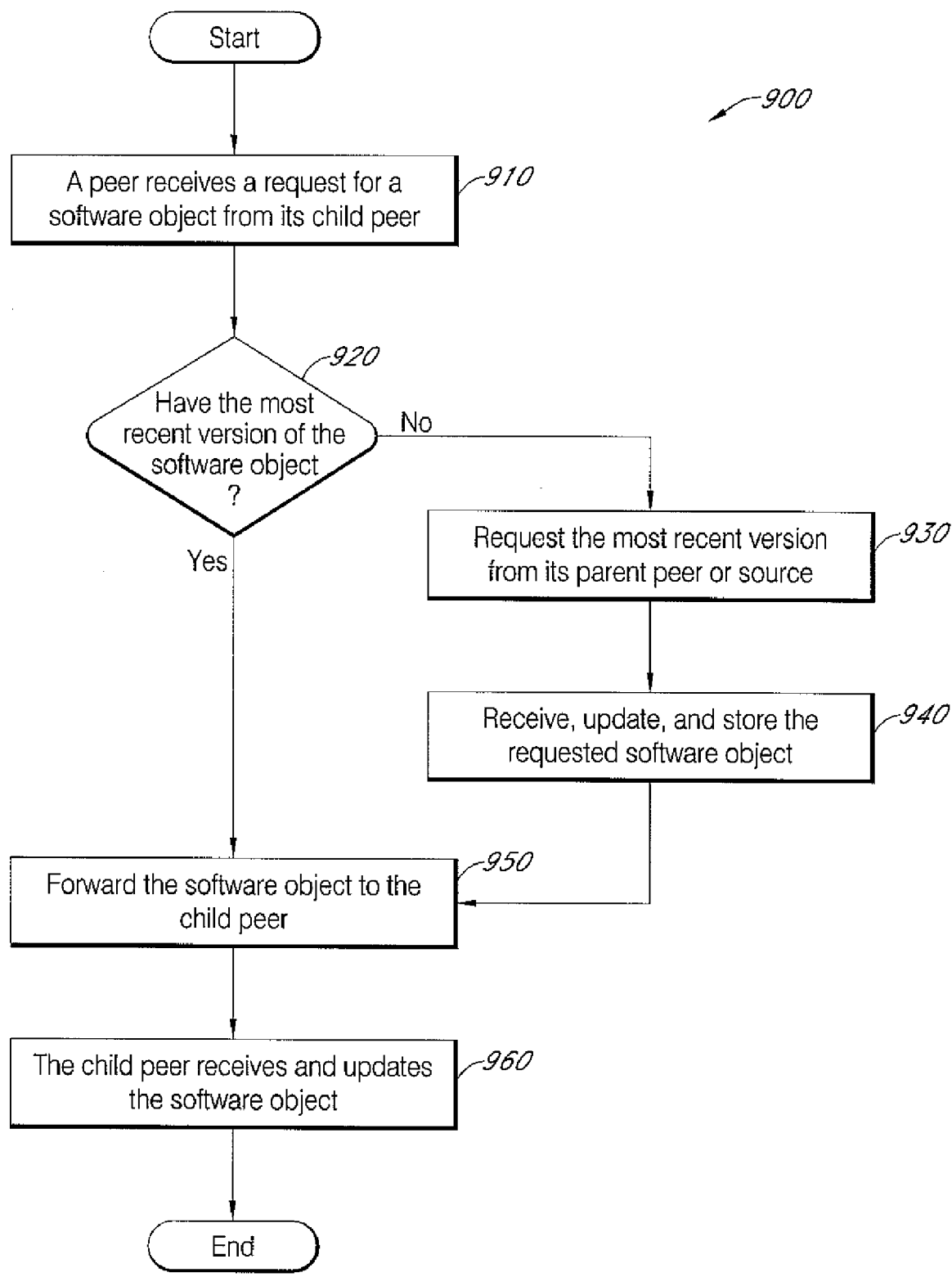
FIG. 9 is a flowchart for an exemplary datacasting procedure according to one embodiment of the invention.

The operations of the system 200 will be described with reference to FIGS. 3A-3D, 4A-4B and 9. In FIGS. 3-4 and 9, the reference numeral "V.2" represents version 2 (e.g., the newest version) of a software object and the reference numeral "V.1" represents version 1 (an older version) of the software object. This description may be applied to another embodiments described with respect to FIGS. 5-7. FIG. 9 is a flowchart for an exemplary datacasting procedure 900 according to one embodiment of the invention. It will be appreciated that the procedure 900 is merely an example and other procedures are also possible. Furthermore, depending on the embodiments, additional states may be added, others removed, or the order of the states changed in FIG. 9.

Figure 3A:
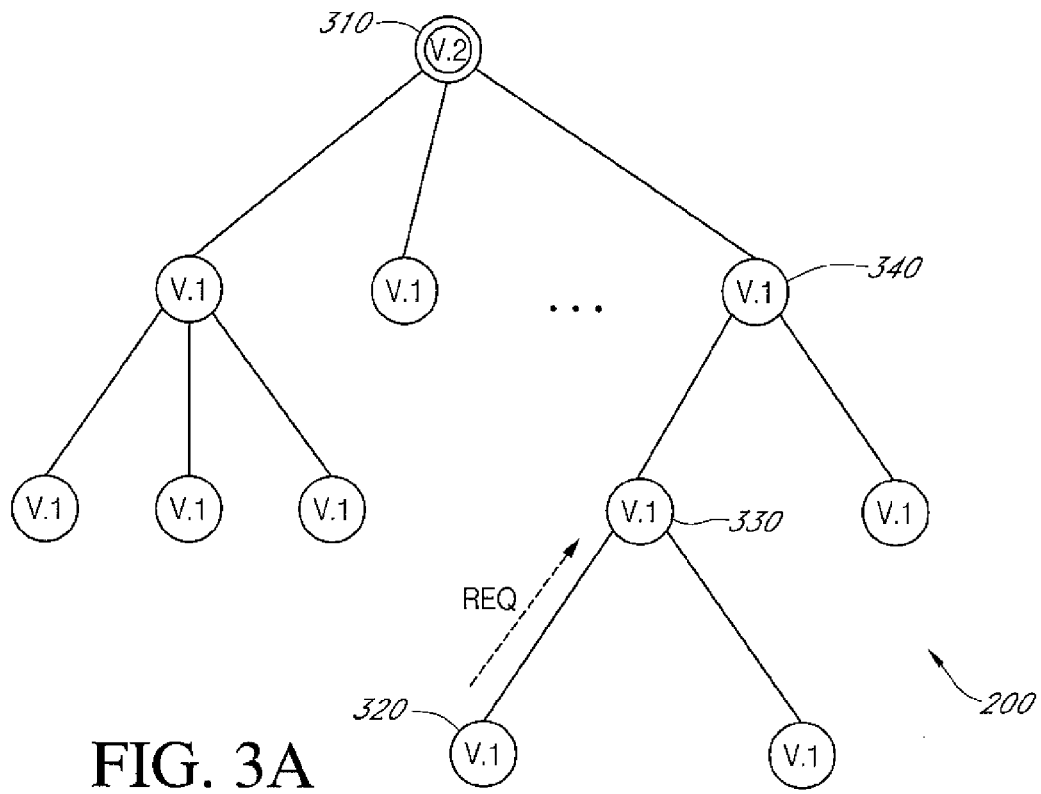
FIGS. 3A-3D illustrate conceptual diagrams showing a first exemplary operation of the datacasting system according to one embodiment of the invention.
Figure 3B:
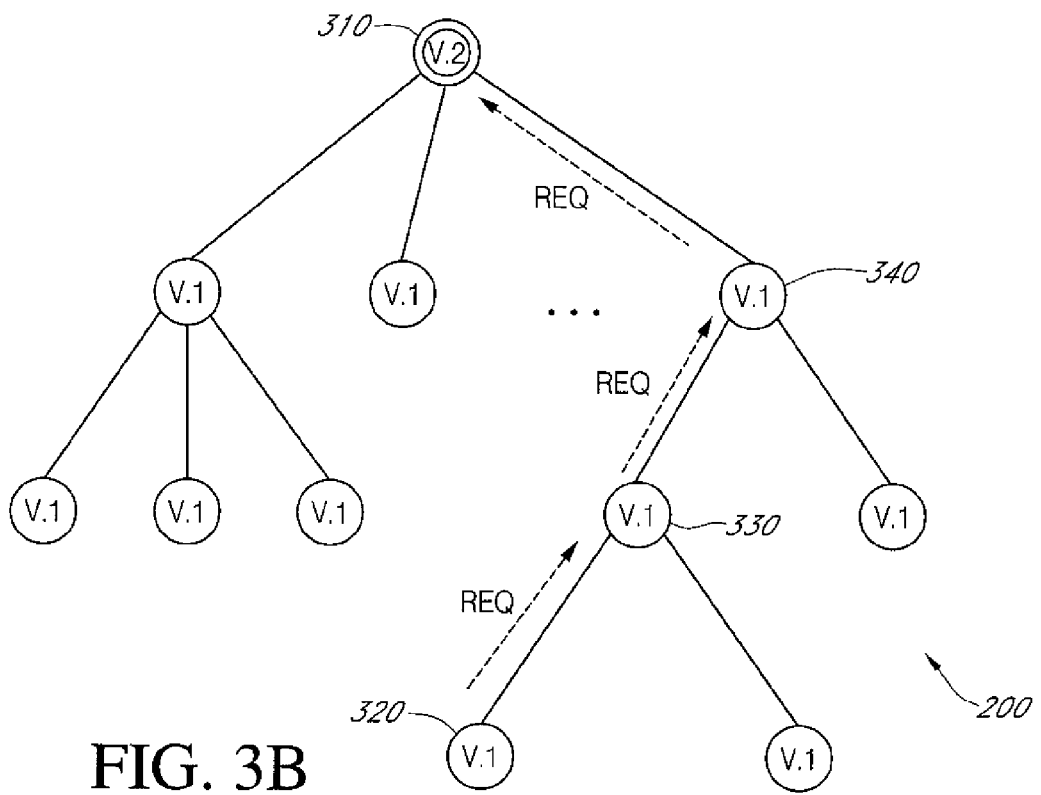
Figure 4A:
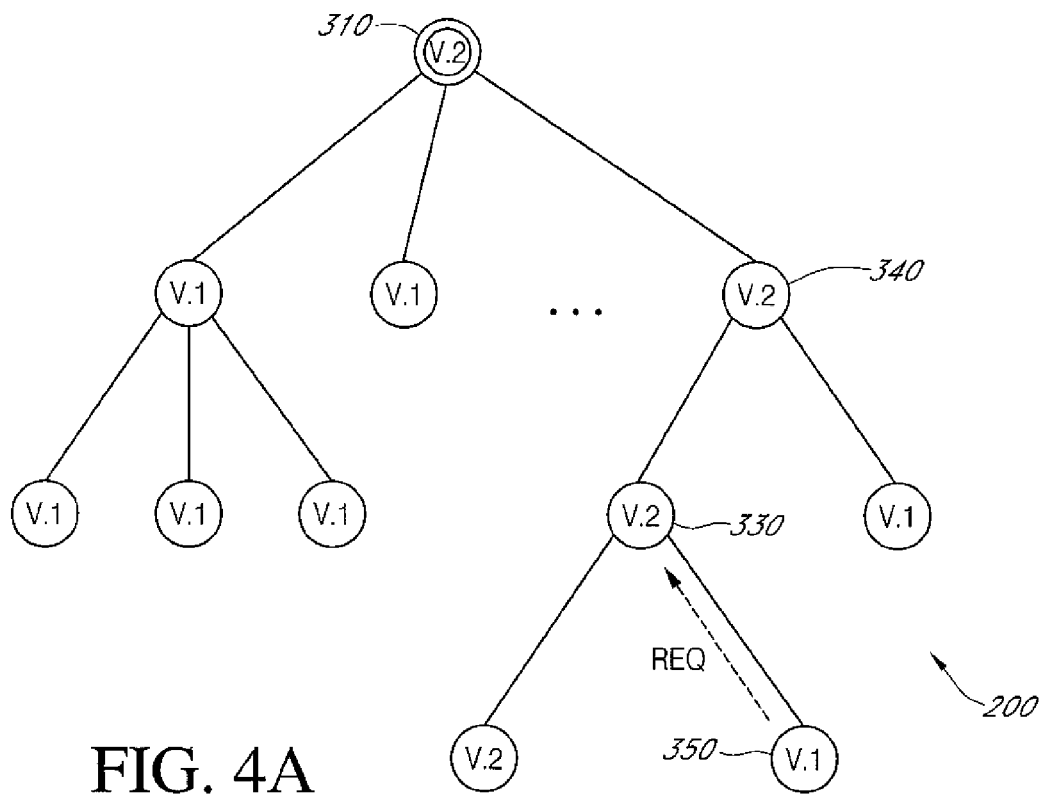
FIGS. 4A-4B illustrate conceptual diagrams showing a second exemplary operation of the datacasting system according to one embodiment of the invention.
Figure 4B:
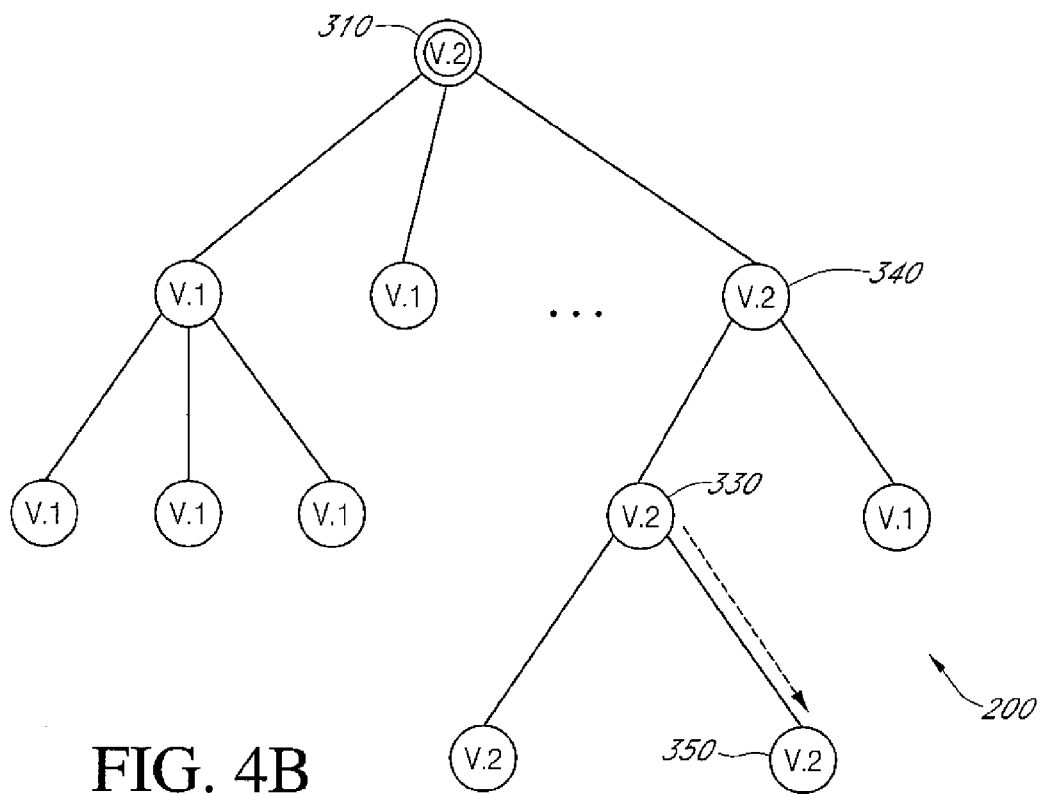

A peer 330 receives a request for the most recent version of a software object from a child peer 320 (910) as shown in FIG. 3A. It is determined whether the peer 330 has the most recent version of the software object associated with the request (920). In one embodiment, the determination can be made based on the update/download activation described above. If the peer 330 does not have the requested most recent software object, the peer 330 delegates the request to the parent peer 340 (930) as shown in FIG. 3B. In one embodiment, the parent peer 340 may also determine whether or not the peer 340 has the most recent software object. If not, the peer 340 delegates the request again to the source 310 as shown in FIG. 3B. In one embodiment, the source 310 may be a peer or server. In one embodiment, such as a tree structure, the source 310 may be located at the root of the tree structure.

Figure 3C:
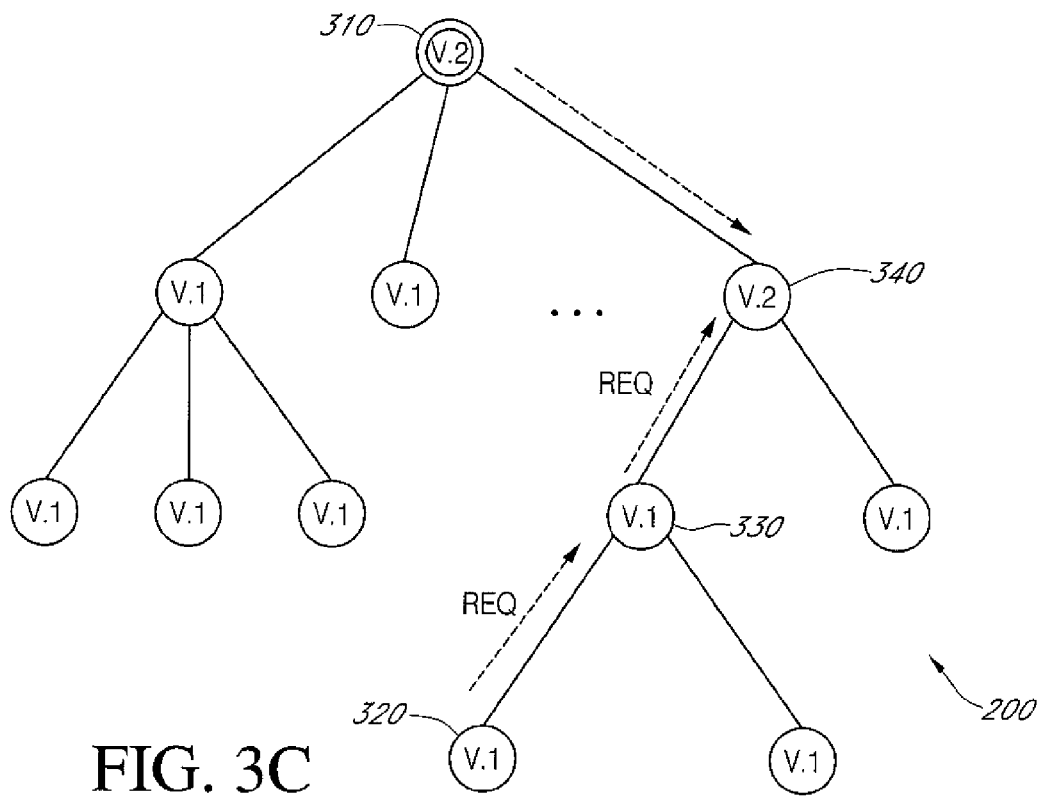
Figure 3D:
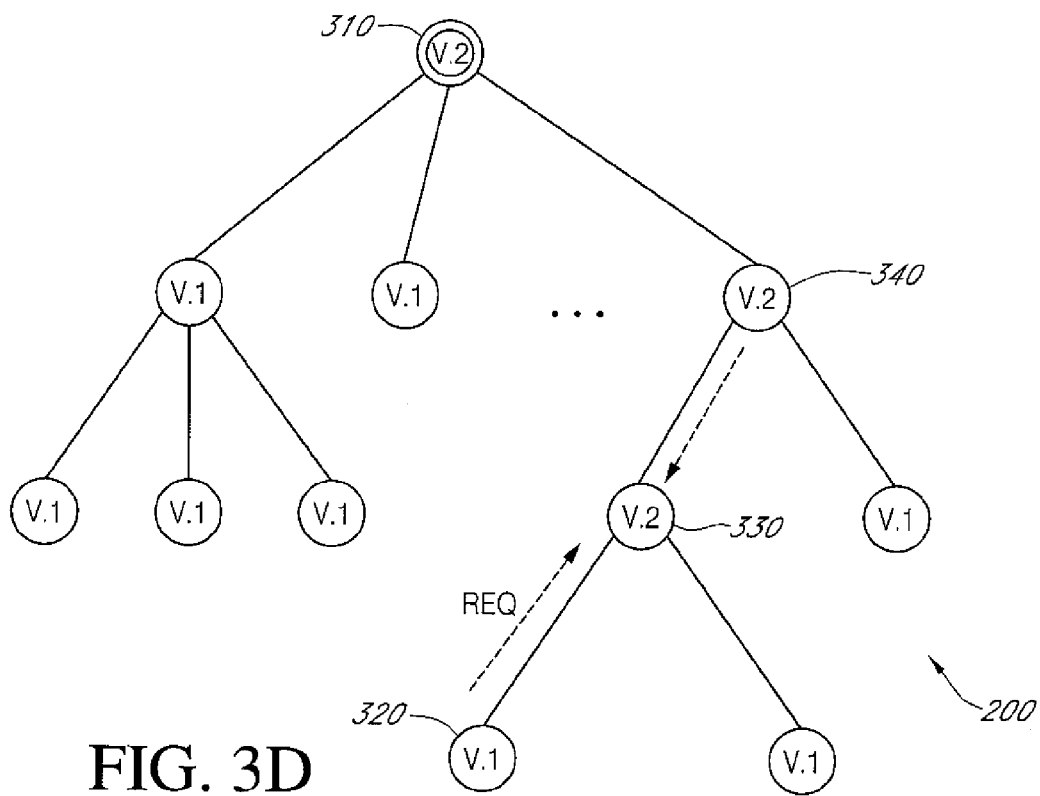

The source 310 provides the requested software object (e.g., V.2) to the peer 340 as shown in FIG. 3C. In one embodiment, the peer 340 may update its old version (e.g., V.1) with the received most recent version (e.g., V.2) as shown in FIG. 3C. Thereafter, the peer 340 forwards the received most recent version to its child peer 330 as shown in FIG. 3D.

In one embodiment, the peer 330 may receive and store the requested most recent version (e.g., V.2) so as to update its old version (e.g., V.1) with the received most recent version (e.g., V.2) (940). The peer 330 forwards the received version of the software object to the child peer 320 which originally requested the most recent version (950). In one embodiment, the child peer 320 may update its old version (e.g., V.1) with the received most recent version (e.g., V.2) (960) for future delegation to another peer which may request the "V.2" version. This way, the software objects may be sequentially updated in all of the peers back-to-back along the path from the root (e.g., 310) to the lowest child (e.g., 320), for example, in the entire tree structure. The peers 330 and 340 may function as intermediary peers discussed above.

The peer 330, which stores the most recent version (e.g., V.2), may receive an update request, with respect to the same version of the software object, from another peer 350 as shown in FIG. 4A. In this situation, since the peer 330 has the requested software object, the peer 330 forwards the most recent version to the child peer 350 without delegation as shown in FIG. 4B. In one embodiment, the update rule applied to the entire tree (e.g., from peers 320→330→340→310→340→330→320 as shown in FIGS. 3A-3D) can be also applied to the sub-tree (e.g., from peers 350→330→350 as shown in FIGS. 4A-4B) exactly in the same way. In the above embodiments, each of the parent peers may act like the root of the tree with respect to its direct child peer.

In one embodiment, the procedures 800 and 900 illustrated in FIGS. 8 and 9 may be implemented by software, hardware or combination thereof. In one embodiment, the procedures 800 and 900 may be implemented in a conventional programming language, such as C or C++ or another suitable programming language. In one embodiment of the invention, the program is stored on a computer accessible storage medium of, for example, the directory service unit 220 (for procedure 800) and each peer or the root 210 (for procedure 900). In another embodiment, the program can be stored in other system locations so long as it can perform the procedures 800 and 900 according to embodiments of the invention. The storage medium may include any of a variety of technologies for storing information. In one embodiment, the storage medium includes a random access memory (RAM), hard disks, floppy disks, digital video devices, compact discs, video discs, and/or other optical storage mediums, etc.

In another embodiment, each peer, the root 210 or the directory service unit 220 may include a processor (not shown) configured to or programmed to perform the respective procedure 800 or 900. The program may be stored in the processor or a memory of each peer, the root 210 or the directory service unit 220. In various embodiments, the processor may have a configuration based on Intel Corporation's family of microprocessors, such as the Pentium™ family, and operating systems such as Unix™, Linux™, Microsoft™ DOS, Microsoft™ Windows 95/98/2000/9x/ME/XP/NT, Macintosh™ OS, OS/2 and the like. In one embodiment, the processor is implemented with a variety of computer platforms using a single chip or multichip microprocessors, digital, signal processors, embedded microprocessors, microcontrollers, etc. In another embodiment, each of the procedures 800 and 900 can be implemented with embedded software.

Alternative Embodiments

Architecture

The directory service unit 220 and the data/file repository 210 may be located in various other locations as exemplified below.

Centralized Server

Figure 5:
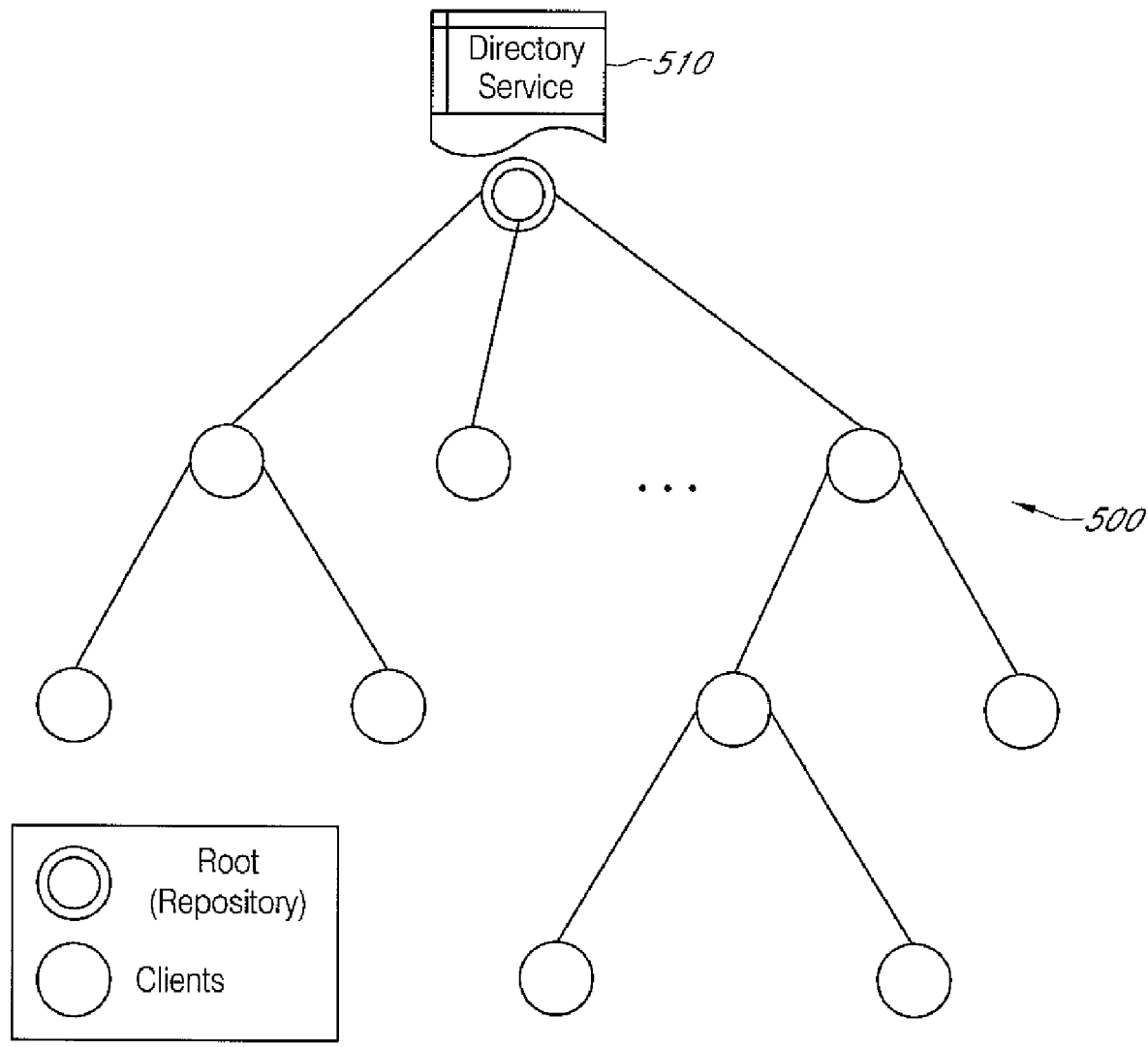
FIG. 5 illustrates a conceptual diagram showing a peer-to-peer datacasting system including a centralized server according to another embodiment of the invention.

FIG. 5 illustrates a conceptual diagram showing a peer-to-peer datacasting system 500 including a centralized server 510 according to another embodiment of the invention. In one embodiment, the server 510 may include both a directory service unit and a data repository as shown in FIG. 5. In one embodiment, the centralized server 510 may include the function of a directory service unit described with respect to the previous embodiments, for example, monitoring and maintaining the system. In one embodiment, as the download workload is reduced, the server 510 can concentrate on the one-to-one transaction that may not be replaced by any other entity in the system 500.

Multilayer Tree

Figure 6:
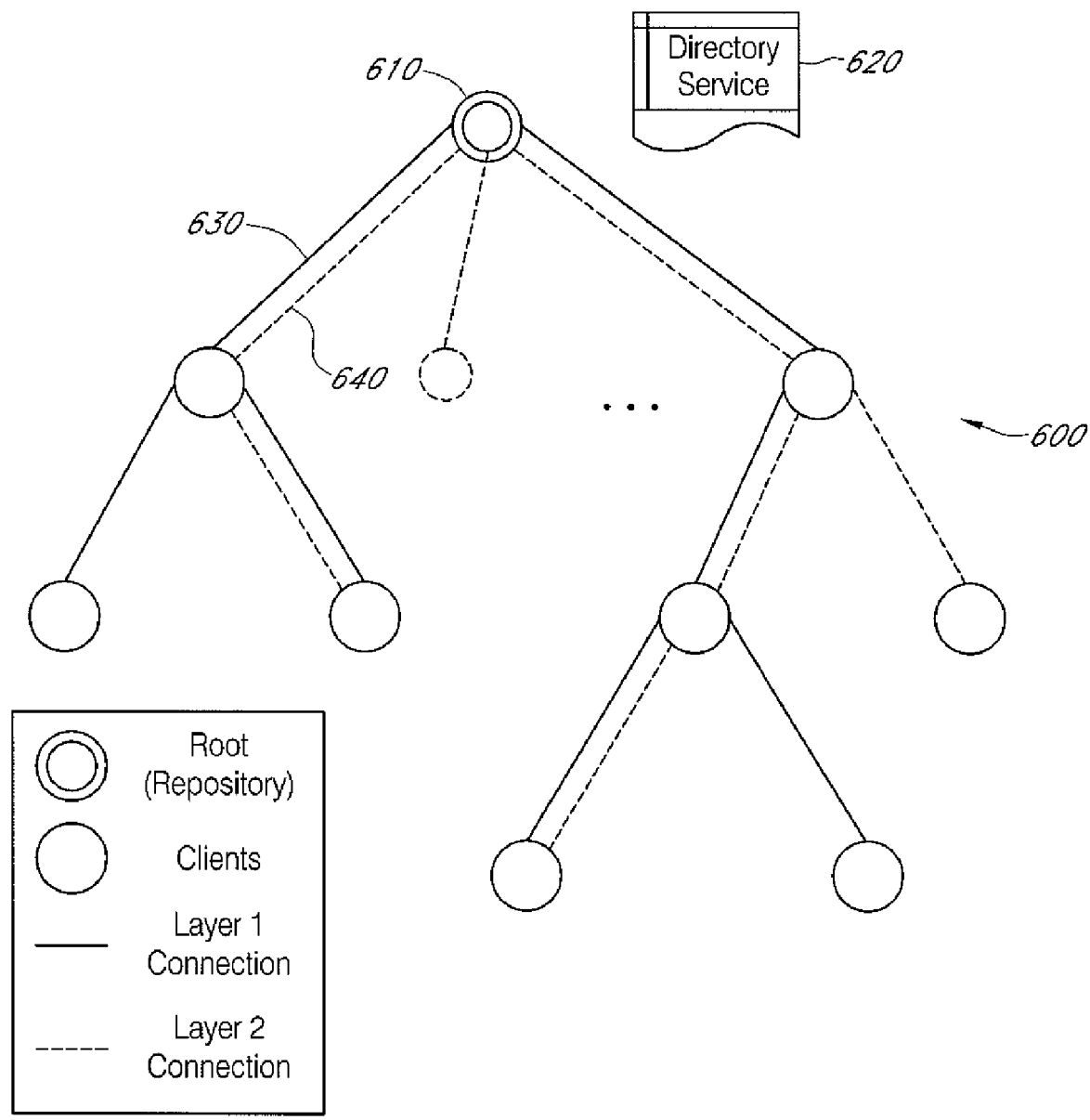
FIG. 6 illustrates a conceptual diagram showing a peer-to-peer datacasting system including two trees over the same set of nodes according to still another embodiment of the invention.

FIG. 6 illustrates a conceptual diagram showing a peer-to-peer datacasting system 600 including two trees over the same set of nodes according to another embodiment of the invention. In this embodiment, there may be two layers formed in substantially the same tree structure: layer 1 (630) (solid line) and layer 2 (640) (dotted line). In one embodiment, in the two layers (630, 640), the data may be slightly different from one peer to another peer, even though the source (e.g., 610) of the data is the same. For example, cable TV EPG data may have some variation of usage from one interest group to another, according to multiple service operators (MSOs) or cable service level. The different data can be treated independently, and distributed over different trees. Alternatively, the data can be partitioned into multiple layers and delivered over different trees, and combined to a single piece of data at the destination node as shown in FIG. 6. In one embodiment, each of the trees may include a data directory unit 620. In this embodiment, both of the units can distribute data independently. In another embodiment, both of the trees may share the same data directory unit 620. It will be appreciated that more than two layer structures may also be possible.

Unorganized P2P

Figure 7:
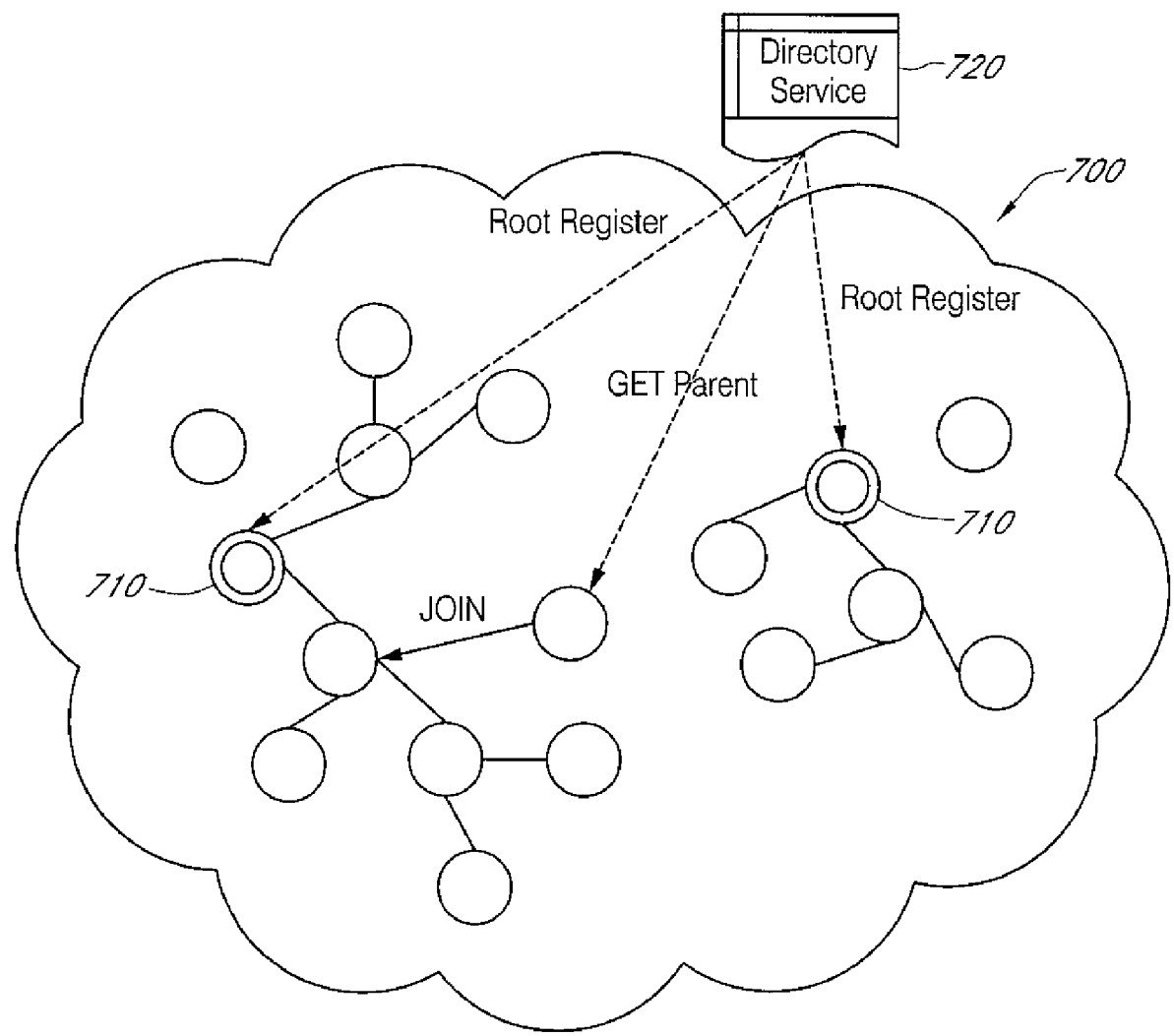
FIG. 7 illustrates a conceptual diagram showing a peer-to-peer datacasting system including trees in an unorganized peer-to-peer network according to still another embodiment of the invention.

FIG. 7 illustrates a conceptual diagram showing a peer-to-peer datacasting system 700 including trees in an unorganized P2P network according to still another embodiment of the invention. Sources 710 of data can be scattered over the network. Accordingly, multiple trees rooted at different sources 710 can co-exist in the network 700 as shown in FIG. 7. In one embodiment, the sources 710 may perform certain functions of a directory service unit 720. In this embodiment, the sources 710 may not store the most recent version of a software object, instead may store the location of the software object. In this embodiment, the sources 710 may inform peers, which request an update, of the location of the most recent software object.

In one embodiment, the system 700 may include a single directory service unit which coordinates the connection and membership management of the multiple trees. In another embodiment, the system 700 may include multiple directory service units for individual groups or sources.

Partial Update of Software Object

In one embodiment, each version of the software objects may be slightly different from each other. In this embodiment, instead of sending the whole software object separately, it is possible to send information to identify the location of the common and of the different portions of the software object. In this embodiment, the receiver can determine what has been changed in the most recent version of the software object with respect to the older version. This way, the size of the data to be transmitted can be reduced.

At least one embodiment provides a viable alternative to the current broadcasting-based datacasting. In one embodiment, using other peers, TVs may no longer need to be strictly tied to the schedule and channel of the broadcaster to receive software objects. From the service supplier's viewpoint, the P2P datacasting according to at least one embodiment provides a cost-effective data/file distribution service using peers only for the selected many, even without the heavy broadcasting infrastructure. In at least one embodiment, the P2P datacasting is highly scalable with respect to the data/file diversity as compared with the typical broadcasting-based datacasting.

From P2P network's viewpoint, at least one embodiment of the invention reduces the non-A/V overhead of the peer communication for the overlay network maintenance, by using the reliable network connectivity in the typical TV operating environment. When applied to a tree topology, at least one embodiment of the P2P datacasting achieves even higher scalability over the typical client-server download service. In one embodiment, the separation of a directory service unit from a data repository further simplifies the download operation into a unified client-cache recursion.

As shown in the "Alternative Embodiments" section, the P2P datacasting according to at least one embodiment is applicable to a wide range of network architecture from the unorganized P2P network to a centralized server system. Thus, embodiments of the invention can be implemented by any service providers, such as the consumer electronics companies which do now own the broadcasting infrastructure, or the broadcaster which wants to save the broadcasting channel resource. At least one embodiment of the invention is feasible and cost-effective, in that TVs are becoming more computationally powerful and an Internet connection is available in many locations today.

While the above description has pointed out the novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of peer-to-peer datacasting in a broadcasting network, the method comprising:
   establishing a peer-to-peer relationship between a first peer and at least one other peer in the broadcasting network, where a source provides a most recent version of an updatable software object with the source communicating the most recent version of the software object to at least one peer in the broadcasting network with the software object being further transmitted via peer-to-peer datacasting to at least one other peer in the broadcasting network;
   receiving, at the first peer, an update request for the software object from a second peer;
   obtaining, at the first peer, the most recent version of the software object associated with the update request wherein the obtaining comprises:
   determining whether the first peer includes the most recent version of the software object;
   transmitting, at the first peer, the update request to the source if the first peer does not include the most recent version; and
   receiving, at the first peer, the requested most recent version of the software object from the source;
   transmitting, at the first peer, the requested most recent version of the software object to the second peer;
   to update the software object of the second peer with the received software object; wherein the first peer is a first client device including a first processor and the second peer is a second client device including a second processor.

2. The method of claim 1, wherein the first client device and the second client devices are television devices selected from the group consisting of a digital television, a set-top box, an Internet protocol (IP) TV, an interactive TV and a computing device configured to handle data broadcasting.

3. The method of claim 1, further comprising updating the software object of the first peer with the received software object.

4. The method of claim 1, wherein the first and second peers and the source form a tree structure.

5. The method of claim 4, wherein the source is 1) a parent peer of the first peer or 2) a server.

6. The method of claim 4, further comprising:
   communicating data between i) at least one additional peer and ii) the source and the first peer; and
   obtaining and providing, at the at least one additional peer, the most recent version-of the software object to the first peer.

7. The method of claim 1, wherein the broadcasting network comprises a television broadcasting network.

8. A method of peer-to-peer datacasting in a digital communication network, the method comprising:
   receiving, at a first peer that is a first client device having a first processor, an update request for a software object, from a second peer that is a second client device having a second processor;
   determining the common portion between i) the most recent version of the software object and ii) the software object of the second peer;
   determining the different portion between i) the most recent version of the
   software object and ii) the software object of the second peer; and
   transmitting the update request to a third peer that is a third client device having a third processor, wherein each of the first, second and third peers stores an updatable software object;
   receiving, at the first peer, the requested most recent version of the software object from the third peer;
   updating the software object of the first peer with the received most recent version; and
   transmitting the requested most recent version of the software object to the second peer so as to update the software object of the second peer with the received most recent version.

9. The method of claim 8, wherein the update request to the third peer is configured to i) determine whether the third peer stores the most recent version of the software object, ii) transmit, at the third peer, the update request to a fourth peer if the third peer does not store the most recent version, iii) receive, at the third peer, the requested most recent version of the software object from the fourth peer and iv) update the software object of the third peer with the received most recent version.

10. The method of claim 8, wherein each of the first, second and third peer includes at least one of the following: a digital television, a set-top box, an Internet protocol (IP) TV, an interactive TV and a computing device configured to handle data broadcasting.

11. The method of claim 10, wherein the software object includes at least one of the following: a file, data, electronic program guide (EPG) data, software component, game application, and firmware which is used for operating the plurality of peers.

12. The method of claim 11, wherein the first, second and third peers belong to a group which has a common interest.

13. The method of claim 12, wherein the common interest group includes one of the following: a group of peers using substantially the same kind of EPG data, a group of peers having the same model number, and a group of peers using substantially the same kind of firmware or software components.

14. The method of claim 8, wherein the first, second and third peers form a first tree structure along with other peers.

15. The method of claim 14, wherein the first peer is a parent node of the second peer and a child node of the third peer.

16. The method of claim 14, wherein the first, second and third peers form a second tree structure which at least partially overlaps with the first tree structure, and wherein a software object being transmitted along the first tree structure is at least partially different from a software object being transmitted along the second tree structure.

17. The method of claim 8, wherein the first, second and third peers form a mesh structure along with other peers.

18. The method of claim 8, wherein the digital communication network comprises at least one of the following: a broadcasting network, a television broadcasting network, a computer network, and Internet.

19. A system for peer-to-peer datacasting in a broadcasting network, the system comprising:
a controller being in data communication with a plurality of peers and a source, wherein each of the plurality of peers is a client device including a processor wherein one of the plurality of peers is configured to receive and store the most recent version of the software object from the source, and wherein the controller is configured to control the plurality of peers such that the software objects of each of the plurality of peers are updated with the most recent version by way of sequential delegation of 1) an update request and 2) the most recent version of the software object between the plurality of peers;
wherein the controller provides directory information to the peers to establish a peer-to-peer relationship for the peers to perform sequential delegation of an update request to obtain the most recent version of the software object from another peer having the most recent version of the software object.

20. The system of claim 19, wherein the source is another peer.

21. The system of claim 20, further comprising a server configured to store location information of the source and transmit only the location information to a peer which requests the most recent version of the software object.

22. The system of claim 21, wherein the controller is incorporated into the server.

23. The system of claim 19, wherein the source is a server.

24. The system of claim 23, wherein the source is configured to notify the plurality of peers of the availability of the most recent version of the software object.

25. The system of claim 19, wherein the most recent version of the software object includes expiration time of the version of the software object.

26. The system of claim 19, wherein each of the plurality of peers includes at least one of the following: a digital television, a set-top box, an Internet protocol (IP) TV, an interactive TV and a computing device configured to handle data broadcasting.

27. One or more processor-readable storage devices having processor-readable code embodied on the processor-readable storage devices, the processor-readable code for programming one or more processors to perform a method of peer-to-peer datacasting in a digital communication network, the method comprising:
providing a first peer that is a first client device having a first processor;
receiving, at the first peer, an update request for a software object, from a second peer that is a second client device having a second processor and determining whether the first peer includes the most recent version of the software object;
in response to determining that the first peer does not include the most recent version of the software object, transmitting the update request to a third peer that is a third client device having a third processor, wherein each of the first, second and third peers stores an updatable software object;
receiving, at the first peer, the requested most recent version of the software object from the third peer;
updating the software object of the first peer with the received most recent version; and
transmitting the requested most recent version of the software object to the second peer so as to update the software object of the second peer with the received most recent version.

28. A system for peer-to-peer datacasting in a broadcasting network, the system comprising:
a first peer that is a first broadcast client device having a first processor and a memory, the peer configured to establish a peer-to-peer relationship with at least one other peer that includes a broadcast client device and perform sequential delegation of software update requests including:
receiving, at the first peer, an update request for a software object, from a second peer and determining whether the first peer includes the most recent version of the software object;
transmitting the update request to a third peer responsive to the first peer not having the most recent version of the software object, wherein each of the first, second and third peers stores an updatable software object;
receiving, at the first peer, the requested most recent version of the software object from the third peer;
updating the software object of the first peer with the received most recent version; and
transmitting the requested most recent version of the software object to the second peer so as to update the software object of the second peer with the most recent version.

29. A method of peer-to-peer datacasting in a broadcasting network, the method comprising:
providing, from a controller, directory information for a plurality of peers to establish a peer-to-peer relationship for the peers to perform sequential delegation of an update request to obtain the most recent version of a software object from another peer having the most recent version of the software object, where each of the plurality of peers is a client device including a processor; and providing, from a source, an update to the most recent version of the software object to at least one peer in the plurality of peers;

wherein software updates are distributed at least partially via peer-to-peer distribution.

30. A system for peer-to-peer datacasting in a broadcasting network, the system comprising:

a controller being in data communication with a plurality of peers and a source, wherein each of the plurality of peers is a client device including a processor, wherein one of the plurality of peers is configured to receive and store the most recent version of the software object from the source, and wherein the controller is configured to control the plurality of peers such that the software objects of each of the plurality of peers are updated with the most recent version by way of sequential delegation of 1) an update request and 2) the most recent version of the software object between the plurality of peers;

wherein the controller provides directory information to the peers to establish a peer-to-peer relationship for the peers to perform sequential delegation of a request to obtain the most recent version of the software object from another peer having the most recent version of the software object;

wherein the software object includes at least one of a firmware image for a digital television device and an electronic program guide (EPG).

* * * * *